Figure 1:
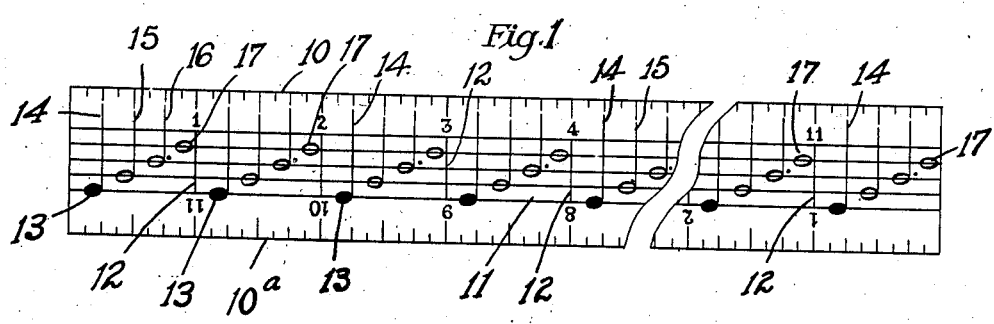

Sept. 14, 1943.  W. T. MOSTER  2,329,551
MUSIC NOTATION RULER
Filed April 11, 1942

INVENTOR.
William T. Moster
BY
ATTORNEYS

Patented Sept. 14, 1943

2,329,551

UNITED STATES PATENT OFFICE 2,329,551

MUSIC NOTATION RULER

William T. Moster, Chicago, Ill.

Application April 11, 1942, Serial No. 438,581

1 Claim. (Cl. 84—484)

This invention relates to an improved ruler for use as an aid in the teaching of music.

Persons beginning the study of music, especially children of grammar school age, frequently experience difficulty in acquiring sufficient knowledge of the elementary forms and values of music notations to enable them to readily identify and translate the time values of such notations.

A principal object of this invention is to provide a simple and inexpensive device whereby the desired knowledge regarding the timing of various music notations, and other music symbols, may be conveyed to the mind of a beginner student of music in association with corresponding values of distance with which he is already familiar or may acquire in his elementary school work.

The main object of the invention, more specifically stated, includes the provision of a ruler having music notations so arranged thereon with relation to the measures of distance on the ruler that a beginner student of music, by the use of such ruler, will unconsciously acquire knowledge of certain fundamentals of music by his association of the forms and time values of the music notations on the ruler with corresponding values of distance measured on the ruler.

Other objects and advantages of the invention will be apparent from the detailed description, hereinafter, of one specific embodiment of the invention.

The said embodiment of the invention is illustrated in Fig. 1 of the accompanying drawing in connection with an ordinary twelve inch ruler, a portion of which is broken away, intermediate its ends, so that the principal features thereof may be shown in their preferred full size.

The ruler shown in Fig. 1 of the drawing is preferably of ordinary flat construction such, for example, as may be used in the elementary grades of public schools. Measuring scales 10—10ᵃ having the usual inch graduations thereon and having the full inch divisions divided into one-eighth inch graduations with the quarter, half and three-quarter graduations indicated by slightly longer marks so as to be readily identified are shown.

The central portion of the improved ruler is provided with a musical staff 11 having bars 12 positioned thereon to align with each of the inch graduations on the measuring scales 10 and 10ᵃ. On each measure on the staff, as defined by the bars 12, music notations, preferably four in number, and having forms to indicate their respective time values, for example ¼, ½, ¾ and whole notes, are so arranged on the staff as to be directly associated with the ¼, ½, ¾ and full inch graduations of each inch measure indicated on the measuring scales.

Each ¼ note, indicated by the reference numeral 13, has a relatively long stem 14 which is in alignment with a ¼ inch graduation on the scale 10; the stem 15 of each half note extends to a ½ inch graduation on the scale; the stem 16 of each three-quarter note, in like manner, leads to a ¾ inch measure on the scale and each whole note 17, together with the adjacent bar 12 is associated with a full one inch measure on the scale.

The music notations herein indicated are shown arranged in ascending order on the staff, but it will be readily apparent that they can be arranged in either ascending or descending order or, if desired, the stems may be extended upwardly or downwardly from the bodies of the notes without departure from the principles of the present invention. It will also be obvious to persons familiar with the principles of this invention that note forms having time values other than herein shown and also music symbols other than notes and having fixed time values may be arranged on the staff 11 in association with graduations on the scale 10 or 10ᵃ, as the case may be, having corresponding distance values. However, it is the aim of the embodiment herein illustrated to avoid confusing the beginner student. The illustrations, therefore, are preferably confined to a minimum number of music notation forms or other music symbols which can be conveniently repeated for each inch measure of the ruler without appearing unduly complicated or confusing to the student.

I claim:

A device for teaching rudiments of music to children by association of basic music symbols with common devices used in other situations comprising: a ruler having a distance measuring scale along a longitudinal edge thereof to indicate inches and fractional portions thereof and provided with rulings of a music staff and having music notations with the stems of the said notations aligned with graduations on said scale having distance values corresponding to the names and the time values of the associated music symbols.

WILLIAM T. MOSTER.